US012578013B2

(12) United States Patent
Francis et al.

(10) Patent No.: US 12,578,013 B2
(45) Date of Patent: Mar. 17, 2026

(54) DRIVE MODULE ASSEMBLY AND DRIVE MODULE SYSTEM INCLUDING THE SAME

(71) Applicant: BorgWarner Inc., Auburn Hills, MI (US)

(72) Inventors: Philip J. Francis, Lapeer, MI (US); Gregory L. Beyerlein, Clarkston, MI (US); Matthew A. Biederwolf, Fishers, IN (US); Arun Narayanan, Rochester Hills, MI (US); Aniruddha Chavan, Sterling Heights, MI (US); Firoz Ali S. Jafri, Troy, MI (US); Matthew Rahaim, Rochester Hills, MI (US); Jason Brown, Highland, MI (US)

(73) Assignee: BORGWARNER INC., Auburn Hills, MI (US)

( * ) Notice: Subject to any disclaimer, the term of this patent is extended or adjusted under 35 U.S.C. 154(b) by 25 days.

(21) Appl. No.: 18/209,642

(22) Filed: Jun. 14, 2023

(65) Prior Publication Data

US 2024/0418257 A1 Dec. 19, 2024

(51) Int. Cl.
*F16H 57/04* (2010.01)
*F16H 57/02* (2012.01)

(52) U.S. Cl.
CPC ..... *F16H 57/0453* (2013.01); *F16H 57/0445* (2013.01); *F16H 57/0457* (2013.01); *F16H 2057/02034* (2013.01)

(58) Field of Classification Search
CPC ....... F16H 57/0453; F16H 2057/02034; F16H 57/0445
See application file for complete search history.

(56) References Cited

U.S. PATENT DOCUMENTS

| | | | |
|---|---|---|---|
| 5,372,213 A * | 12/1994 | Hasebe | B60K 1/02 |
| | | | 184/6.12 |
| 5,505,112 A | 4/1996 | Gee | |
| 7,174,998 B2 | 2/2007 | Pringle et al. | |

(Continued)

FOREIGN PATENT DOCUMENTS

| | | |
|---|---|---|
| CN | 114396472 A | 4/2022 |
| DE | 102007011029 A1 | 9/2008 |

(Continued)

OTHER PUBLICATIONS

English language abstract for CN 114396472 A extracted from espacenet.com database on Feb. 3, 2025, 2 pages.

*Primary Examiner* — Michael A Riegelman
(74) *Attorney, Agent, or Firm* — Howard & Howard Attorneys PLLC

(57) ABSTRACT

A drive module assembly includes a housing defining a housing interior for containing a lubricant. The housing interior is further defined as a first housing interior and a second housing interior. The drive module assembly also includes a first input shaft configured to receive rotational torque from a first power source, a first gear train rotatably coupled to the first input shaft, a first output shaft rotatably coupled to the first gear train, a second input shaft configured to receive rotational torque from a second power source, a second gear train disposed rotatably coupled to the second input shaft, and a second output shaft rotatably coupled to the second gear train. The first housing interior and the second housing interior are fluidly separate from one another.

18 Claims, 8 Drawing Sheets

(56)        References Cited

U.S. PATENT DOCUMENTS

| | | | | |
|---|---|---|---|---|
| 8,961,360 | B2 * | 2/2015 | Ooiso | B60L 3/0023 |
| | | | | 475/331 |
| 10,746,282 | B2 | 8/2020 | Ito et al. | |
| 11,155,161 | B2 * | 10/2021 | Makino | B60K 17/145 |
| 11,231,103 | B2 * | 1/2022 | Staake | F16H 57/0441 |
| 11,619,296 | B2 * | 4/2023 | Gyarmati | F16H 57/045 |
| | | | | 184/6.12 |
| 11,906,037 | B2 * | 2/2024 | Liu | F16H 57/0435 |
| 2004/0000450 | A1 * | 1/2004 | Fabry | B62D 11/16 |
| | | | | 184/6.12 |
| 2009/0218169 | A1 * | 9/2009 | Kawamura | F01M 13/00 |
| | | | | 184/6.5 |
| 2016/0186855 | A1 | 6/2016 | Tahara et al. | |
| 2017/0234483 | A1 * | 8/2017 | Mallette | F16N 7/40 |
| | | | | 184/6.4 |
| 2018/0015815 | A1 * | 1/2018 | Makino | F16H 57/029 |
| 2019/0128179 | A1 | 5/2019 | Kiyokami et al. | |
| 2022/0250460 | A1 | 8/2022 | Deng | |
| 2024/0117875 | A1 | 4/2024 | Watanabe et al. | |

FOREIGN PATENT DOCUMENTS

| | | | |
|---|---|---|---|
| EP | 4166819 | A1 | 4/2023 |
| JP | H06288465 | A | 10/1994 |
| WO | 2022135082 | A1 | 6/2022 |

* cited by examiner

Single Unit

LH Unit                              RH Unit

DRIVE MODULE ASSEMBLY AND DRIVE MODULE SYSTEM INCLUDING THE SAME

BACKGROUND OF THE DISCLOSURE

1. Field of the Disclosure

This invention relates generally to drive module assembly, and in particular to a drive module assembly for use in a drive module system.

2. Description of the Related Art

Typical drive module assemblies include a housing defining a housing interior for containing a lubricant, a first input shaft configured to receive rotational torque from a first power source, a first gear train rotatably coupled to the first input shaft, a first output shaft rotatably coupled to the first gear train, a second input shaft configured to receive rotational torque from a second power source, a second gear train disposed rotatably coupled to the second input shaft, and a second output shaft rotatably coupled to the second gear train.

Lubricant in the drive module assembly is used to lubricate and cool various components, such as the first and second gear trains, during use of the drive module assembly. In some applications, such as in vehicles, the drive module assembly may encounter various events that cause the lubricant in the housing interior to move and slosh within the housing interior. For example, the lubricant may quickly move to one side of the housing interior, which may cause some portions of the housing interior to become dryer than desired. In high performance vehicles using typical drive module assemblies, the movement of lubricant to one side of the housing interior is particularly relevant during intense driving maneuvers. When the lubricant sloshes around and quickly move to one side of the housing interior, a sump containing lubricant becomes drier than desired. In such instances, when there is a reduced volume of lubricant in the sump, a pump is unable to pull lubricant to adequately pump the lubricant to where the lubricant is needed to cool and lubricate various components of the drive module assembly. Additionally, when the lubricant sloshes and moves around in the housing interior, the lubricant may interact with various components of the drive module assembly, such as an electric motor, which causes shear of the lubricant and generates heat. This may result in overheating of the electric motor, even more particularly if the electric motor is lubricant cooled, which results in temporary or permanent degrading of performance of the electric motor.

To this end, there remains a need for an improved drive module assembly.

SUMMARY OF THE INVENTION

A drive module assembly includes a housing defining a housing interior for containing a lubricant. The housing interior is further defined as a first housing interior and a second housing interior. The drive module assembly also includes a first input shaft disposed in the first housing interior, extending along a first input axis, coupled to the housing, and configured to receive rotational torque from a first power source. The drive module assembly also includes a first gear train disposed in the first housing interior and rotatably coupled to the first input shaft, and a first output shaft rotatably coupled to the first gear train and configured to provide rotational torque. The drive module assembly further includes a second input shaft disposed in the second housing interior, extending along a second input axis, coupled to the housing, and configured to receive rotational torque from a second power source. The drive module assembly also includes a second gear train disposed in the second housing interior and rotatably coupled to the second input shaft, and a second output shaft rotatably coupled to the second gear train and configured to provide rotational torque. The first housing interior and the second housing interior are fluidly separate from one another such that lubricant in the first housing interior is prevented from moving into the second housing interior and such that lubricant in the second housing interior is prevented from moving into the first housing interior.

BRIEF DESCRIPTION OF THE DRAWINGS

Other advantages of the present disclosure will be readily appreciated, as the same becomes better understood by reference to the following detailed description when considered in connection with the accompanying drawings.

DETAILED DESCRIPTION OF THE INVENTION

Figure 1:
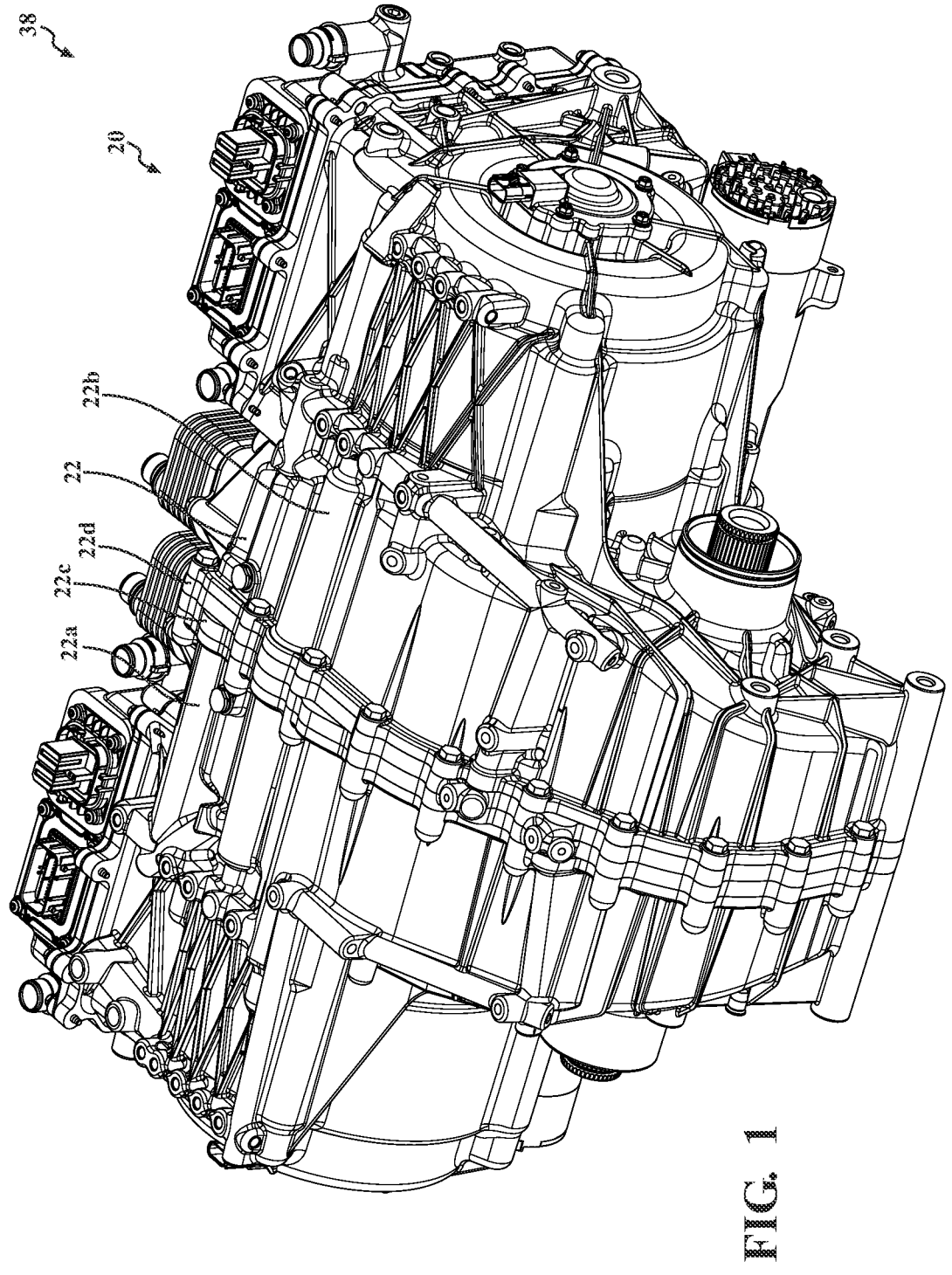
FIG. 1 is a perspective view of a drive module assembly including a housing.

With reference to the Figures, wherein like numerals indicate like parts throughout the several views, a drive module assembly 20 is generally shown in FIG. 1. It is to be appreciated that the drive module assembly 20 may be used with an internal combustion engine, electric machines and propulsion systems, transfer cases, transmissions, and the like.

Figure 2:
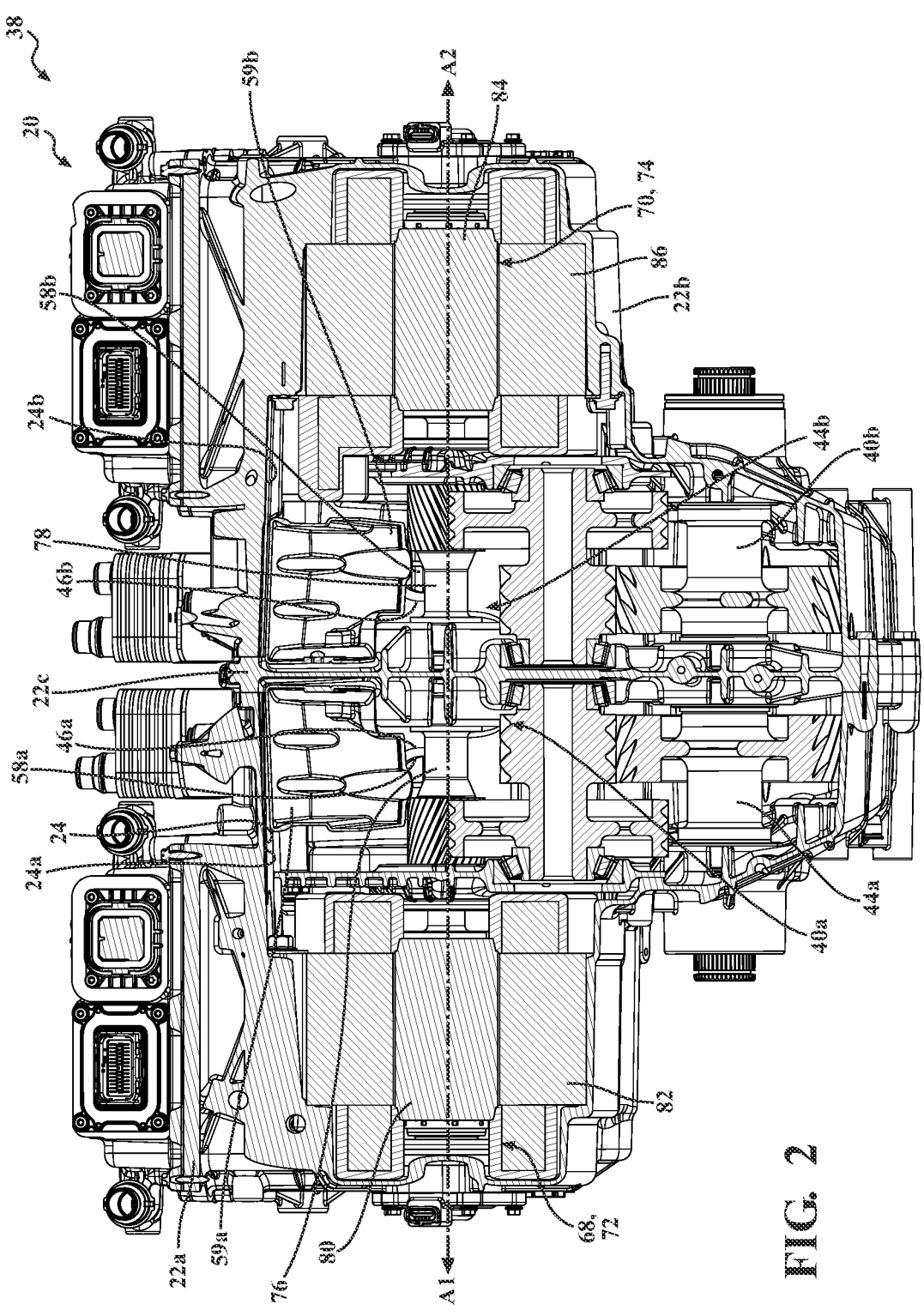
FIG. 2 is a cross-sectional view of the drive module assembly, with the drive module assembly including a first and second input shaft, a first and second gear train, a first and second output shaft, and with the housing defining a housing interior that is further defined as a first housing interior and a second housing interior.

With reference to FIG. 2, the drive module assembly 20 includes a housing 22 defining a housing interior 24 for containing a lubricant. The housing interior 24 is further defined as a first housing interior 24a and a second housing interior 24b. The housing 22 may be further defined as a first housing 22a defining the first housing interior 24a and a second housing 22b defining the second housing interior 24b With reference to FIG. 2, the drive module assembly 20 includes a first input shaft 76 disposed in the first housing interior 24a, extending along a first input axis A1, and coupled to the housing 22. The first input shaft 76 is configured to receive rotational torque from a first power source 68, such as an internal combustion engine, an electric machine, and the like.

The drive module assembly 20 further includes a first gear train 40a disposed in the first housing interior 24a. The first gear train 40a is rotatably coupled to the first input shaft 76. The first gear train 40a may be any suitable gear train for transmitting rotational torque from the first input shaft 76. The first gear train 40a may include any number of gears 42, such as two gears, three gears, four gears, or five or more gears, to transmit torque. The first gear train 40a may include any number of shafts and layshafts, and the first gear train 42a may also be an epicyclic gear train (planetary gearset). The drive module assembly 20 also includes a first output shaft 44a rotatably coupled to the first gear train 40a. The first output shaft 44a is configured to provide rotational torque. For example, the first output shaft 44a may provide rotational torque to wheels of a vehicle.

The drive module assembly 20 further includes a second input shaft 78 disposed in the second housing interior 24b, extending along a second input axis A2, and coupled to the housing 22. The second input shaft 78 is configured to receive rotational torque from a second power source 70, such as an internal combustion engine, and electric machine, and the like. It is to be appreciated that the first power source 68, the second power source 70, and the drive module assembly 20 collectively form a drive module system 38.

In one embodiment, the first power source 68 is further defined as a first electric machine 72 and the second power source 70 is further defined as a second electric machine 74. The first power source 68 is configured to provide rotational torque to the first input shaft 76, and the second power source 70 is configured to provide rotational torque to the second input shaft 78. Typically, the first electric machine 72 is disposed in the first housing interior 24a and the second electric machine 74 is disposed in the second housing interior 24b. The first electric machine 72 typically has a first rotor 80 coupled to the first input shaft 76 and a first stator 82 disposed about the first rotor 80. Similarly, the second electric machine 74 typically has a second rotor 84 coupled to the second input shaft 78 and a second stator 86 disposed about the second rotor 84. Both the first and second electric machines 72, 74 may be configured as an electric motor and/or as a generator.

The drive module assembly 20 additionally includes a second gear train 40b disposed in the second housing interior 24b and rotatably coupled to the second input shaft 78. The second gear train 40b may be any suitable gear train for transmitting rotational torque from the second input shaft 78. The second gear train 40b may include any number of gears 42, such as two gears, three gears, four gears, or five or more gears, to transmit torque. The second gear train 40b may include any number of shafts and layshafts, and the second gear train 40b may also be an epicyclic gear train (planetary gearset). The drive module assembly 20 further includes a second output shaft 44b rotatably coupled to the second gear train 40b. The second output shaft 44b is configured to provide rotational torque. For example, the second output shaft 44b may provide rotational torque to wheels of a vehicle.

The first housing interior 24a and the second housing interior 24b are fluidly separate from one another such that lubricant in the first housing interior 24a is prevented from moving into the second housing interior 24b and such that lubricant in the second housing interior 24b is prevented from moving into the first housing interior 24a.

Figure 8:
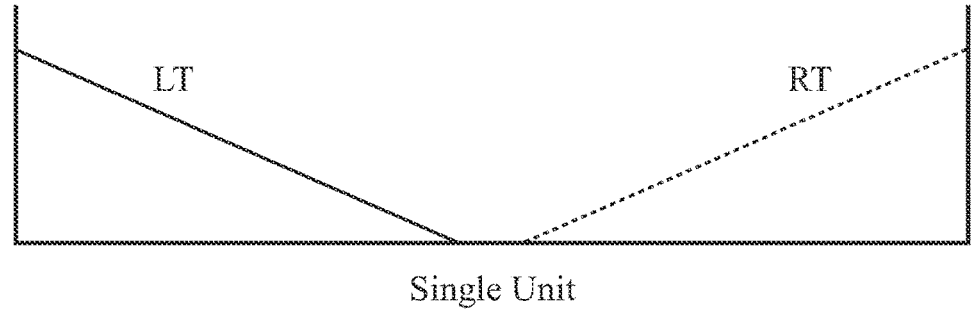
FIG. 8 is a schematic illustration of a prior art drive module assembly.
Figure 9:
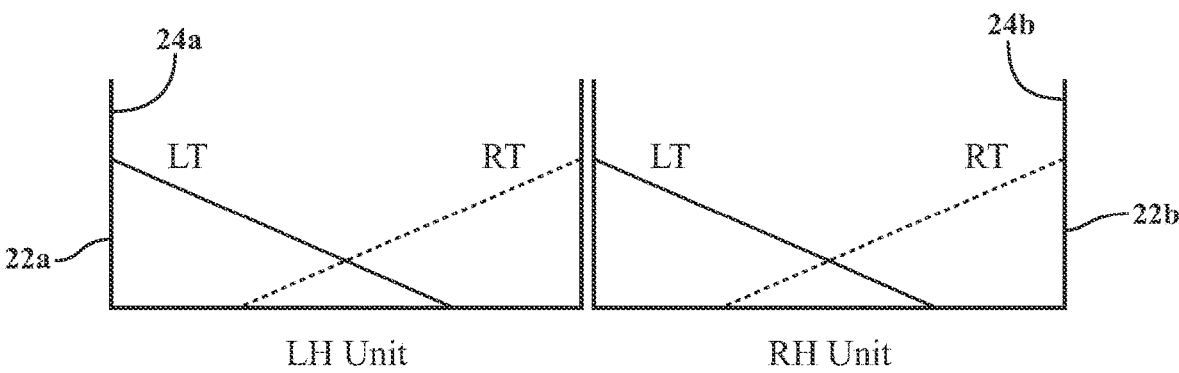
FIG. 9 is a schematic illustration of the first housing interior and the second housing interior.

Having the first housing interior 24a and the second housing interior 24b are fluidly separate from one another provides several advantages. First, having the first housing interior 24a and the second housing interior 24b fluidly separate from one another allows both of the first housing interior 24a and the second housing interior 24b to have their own lubricant sump. Second, because the first housing interior 24a and the second housing interior 24b are fluidly separate from one another, the sloshing and movement of lubricant during movement of the drive module assembly 20, for example during quick maneuvers of a vehicle, is reduced. This is illustrated in FIGS. 8 and 9. FIG. 8 illustrates a drive module assembly that has a single housing interior. The LT and RT in FIG. 8 illustrate the level of lubricant during movement of a drive module assembly occurring during a right turn (RT) and left turn (LT) of a vehicle, which shows lubricant moving to each side of the housing interior, which has the potential to leave a sump of the housing interior dry. FIG. 9 illustrates the drive module assembly 20 in which the first housing interior 24a and the second housing interior 24b are fluidly separate from one another. This reduces the movement of lubricant during movement of the drive module assembly 20, for example during quick maneuvers of a vehicle. The left turn (LT) and right turn (RT) in FIG. 9 of both the LH unit (first housing interior 24a) and the RH unit (second housing interior 24b) shows the lubricant more level inside of the first housing interior 24a and second housing interior 24b, which allows a sump in the first housing interior 24a and second housing interior 24b to remain submerged in lubricant to provide lubricant to various components of the drive module assembly 20. It is to be appreciated that in some embodiments, a small portion of lubricant may move between the first housing interior 24a and the second housing interior 24b, such as through leaks or from movement of the drive module assembly 20 that may cause a small portion of lubricant to slash into the first housing interior 24a from the second housing interior 24b, and vice versa. It is also to be appreciated that in other embodiments the first housing interior 24b and the second housing interior 24b are completely fluidly separated such that no lubricant is able to move into the second housing interior 24b from the first housing interior 24a and such that no lubricant is able to move into the first housing interior 24a from the second housing interior 24b.

The drive module assembly 20 may include a dividing wall 22c disposed between the first housing interior 24a and the second housing interior 24b, with the dividing wall 22c fluidly separating the first housing interior 24a and the second housing interior 24b from one another. The dividing wall 22c may be integral with one of the first and second housings 22a, 22b. It is to be appreciated that the drive module assembly 20a may have a second dividing wall 22d, as shown in FIG. 1, where the dividing wall 22c is coupled to the first housing 22a and the second dividing wall 22d is coupled to the second housing 22b. In other words, the drive module assembly 20 may have one dividing wall fluidly separating the first housing interior 24a from the second housing interior 24b, or the drive module assembly 20 may have two dividing walls. The first dividing wall 22c may be removably coupled to the first housing 22a and the second dividing wall 22d may be removably coupled to the second housing 22b. The first dividing wall 22c may be integral with the first housing 22a and the second dividing wall 22d may be integral with the second housing 22b.

Figure 3:
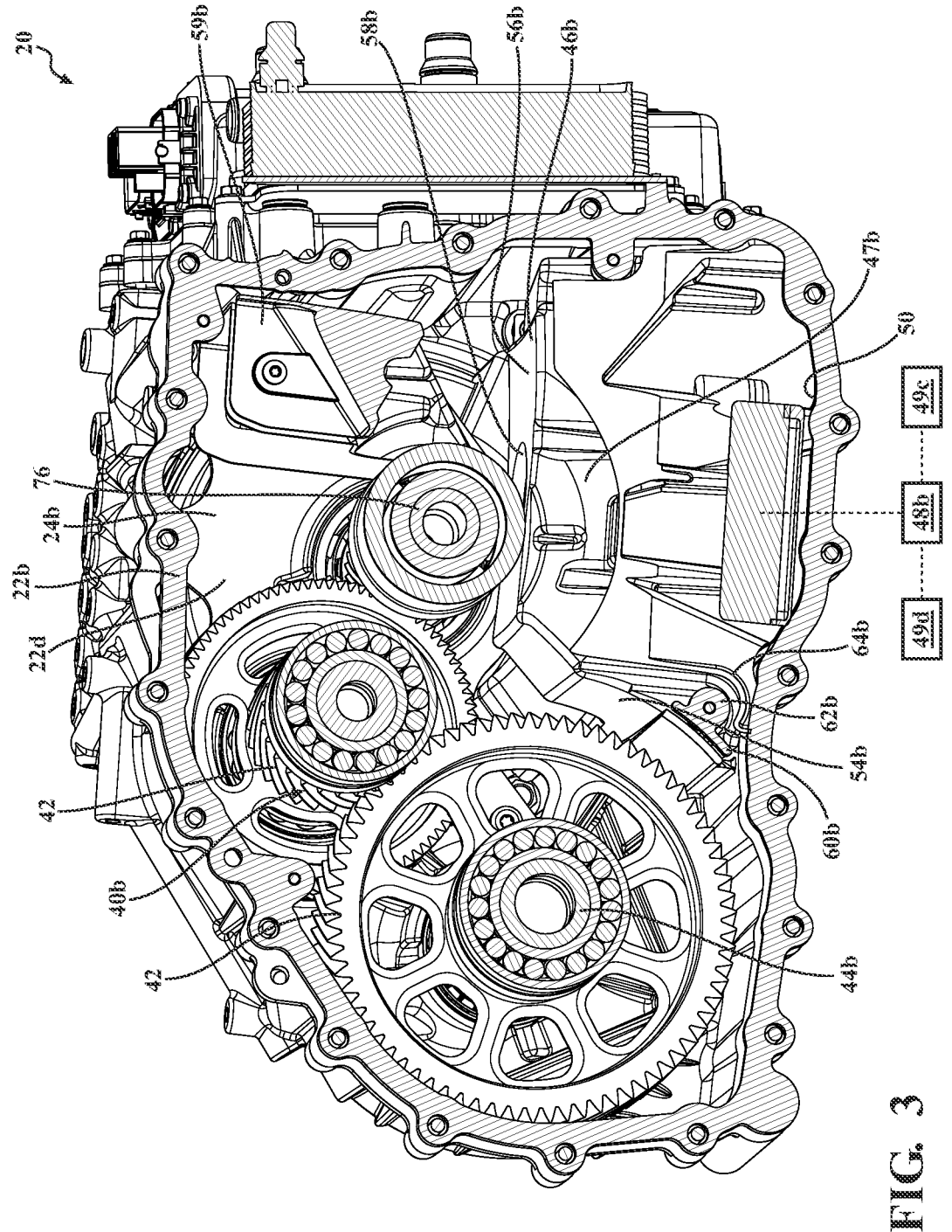
FIG. 3 is another cross-sectional view of the drive module assembly.
Figure 7:
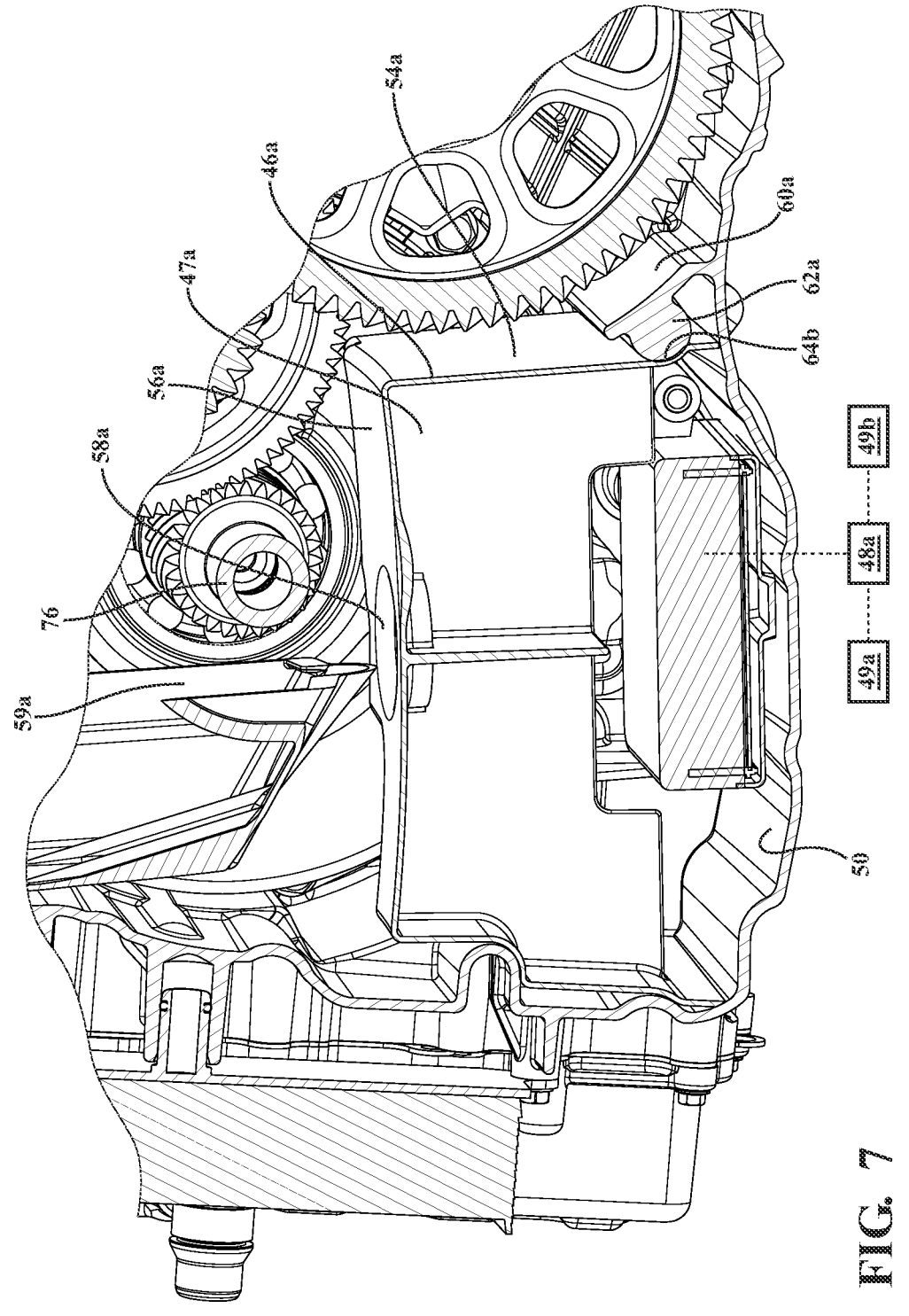
FIG. 7 is another cross-sectional view of the drive module assembly.

With reference to FIG. 7, the drive module assembly 20 may include a first pump 48a coupled to the housing 22, with the first pump 48a being configured to distribute lubricant throughout the first housing interior 24a. The drive module assembly 20, as shown in FIG. 3, include a second pump 48b coupled to the housing 22, with the second pump 48a being configured to distribute lubricant throughout the second housing interior 24b. The drive module assembly 20 may also include a first and second scavenge pump 49a, 49b coupled to the housing 22 and configured to pump lubricant into a first sump in the first housing interior 24a, and a third and fourth scavenge pump 49c, 49d coupled to the housing 22 and configured to pump lubricant into a second sump in the second housing interior 24b. Typically, forced lubrication is used to lubricate the first and second housing interiors 24a, 24b.

Figure 4:
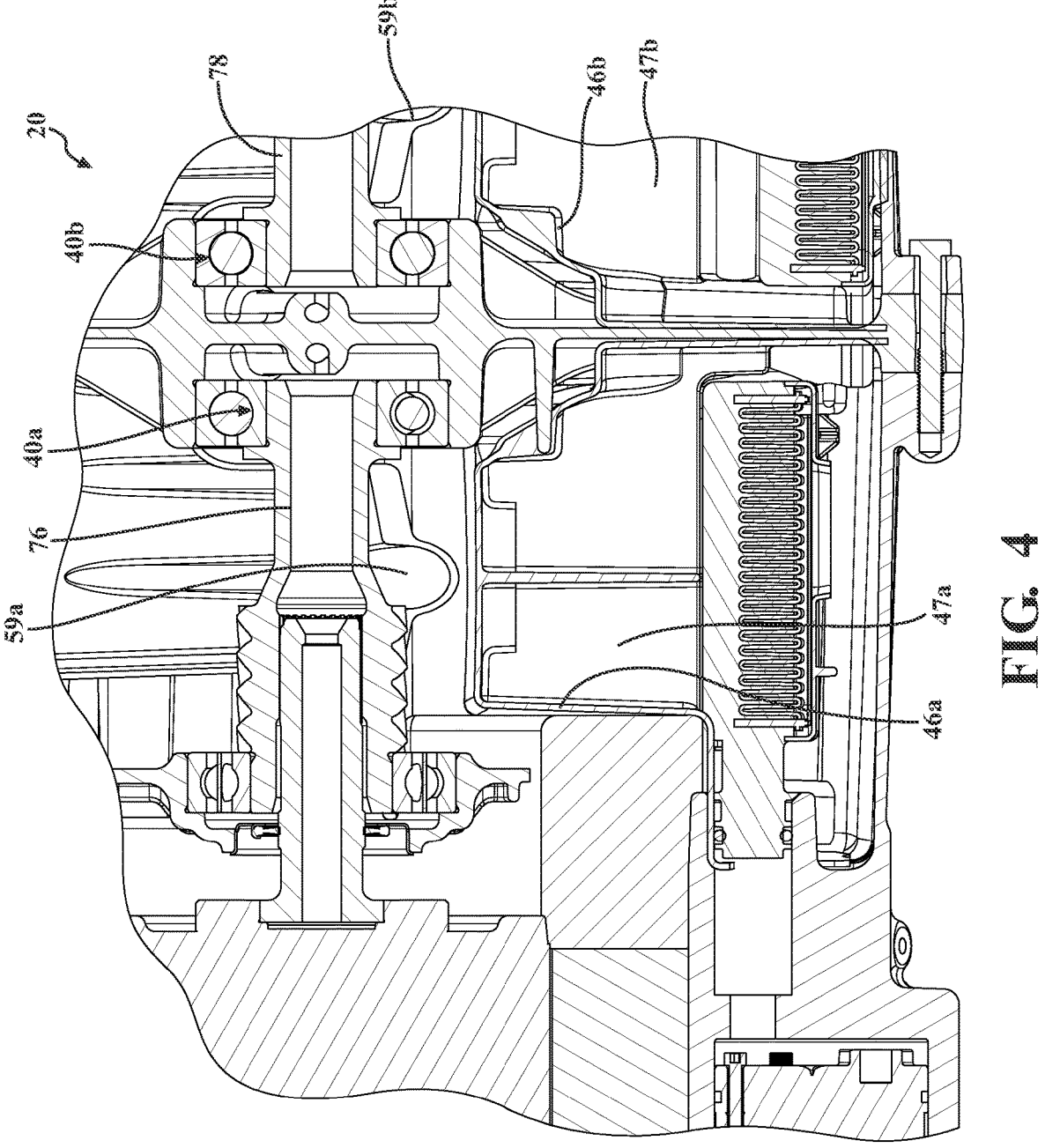
FIG. 4 is another cross-sectional view of the drive module assembly.
Figure 5:
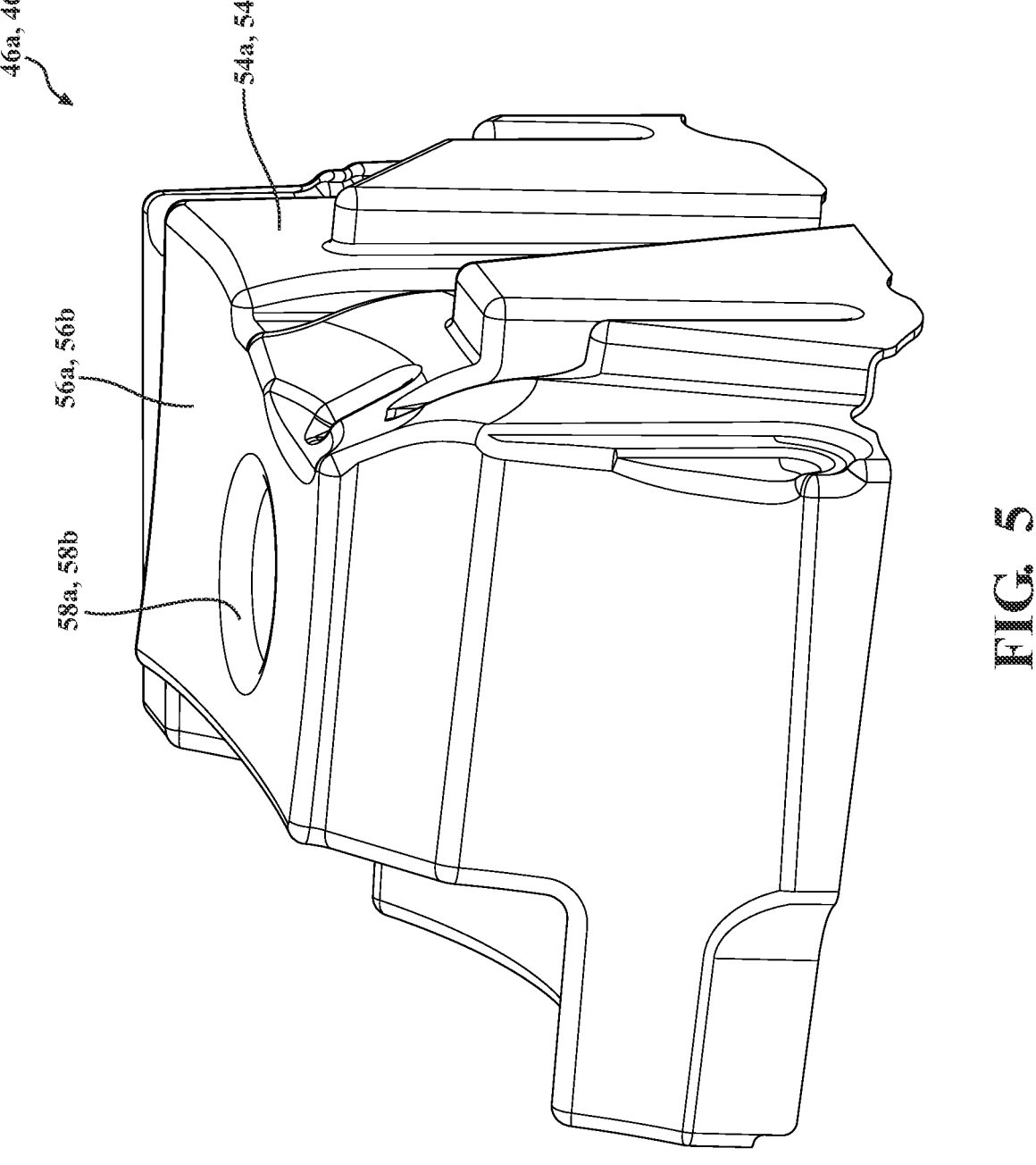
FIG. 5 is a perspective view of an oil housing.
Figure 6:
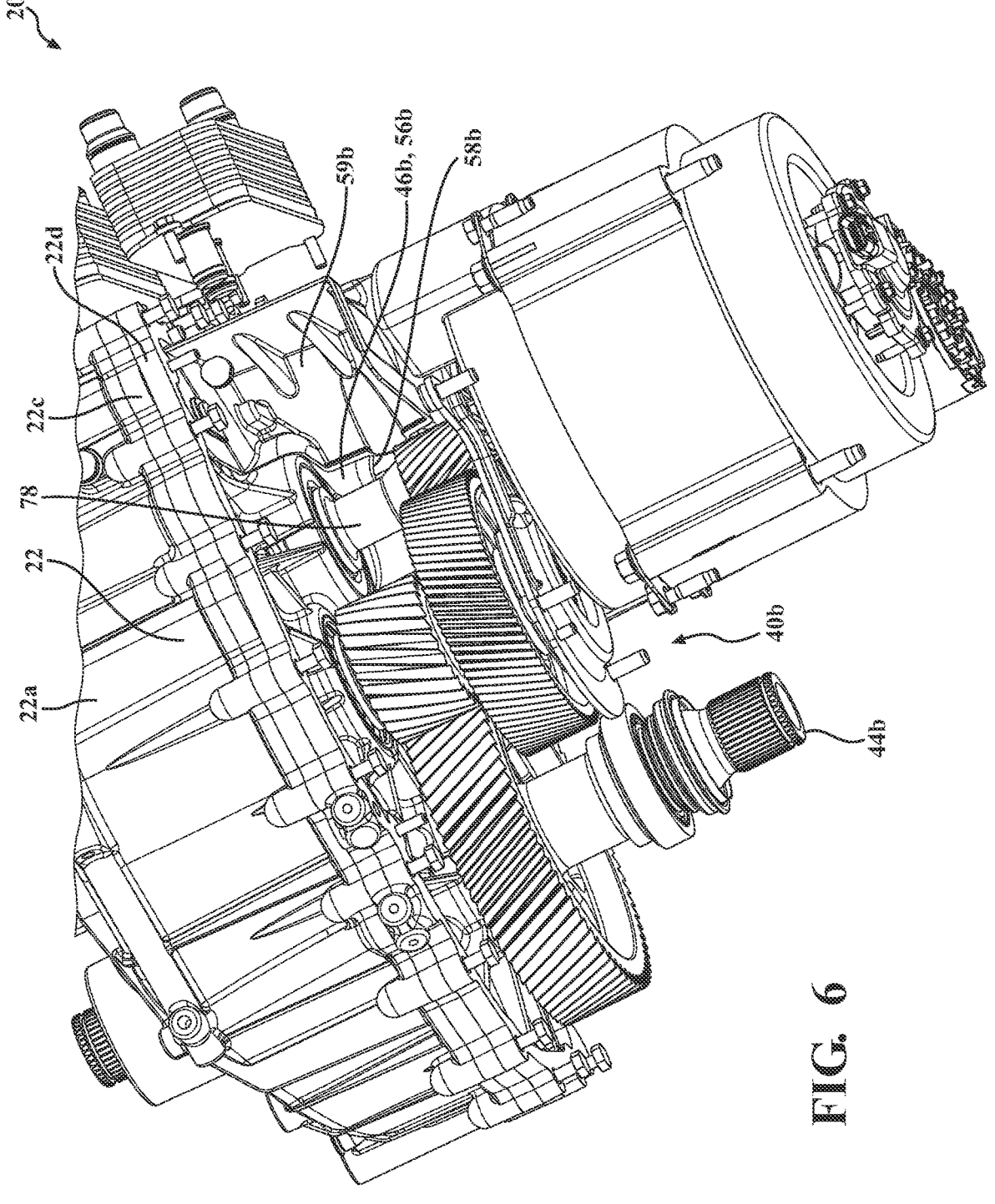
FIG. 6 is a perspective view of the drive module assembly with a portion of the housing removed.

As shown in FIGS. 2-4, the drive module assembly 20 additionally includes a first oil housing 46a disposed in the first housing interior 24a and a second oil housing 46b disposed in the second housing interior 24b. It is to be appreciated that description of the first oil housing 46a equally applies to the second oil housing 46b, and vice versa. For ease of illustration, the first oil housing 46a is shown in some FIGS., such as FIGS. 2, 4, and 7, whereas the second oil housing 46a is shown in FIGS. 2, 3, 4, and 6. A representation of both the first and second oil housings 46a, 46b is shown in FIG. 5.

The first oil housing 46a defines a first oil housing interior 47a that is configured to retain a portion of the lubricant in the first housing interior 24a. The second oil housing 46b defines a second oil housing interior 47b that is configured to retain a portion of the lubricant in the second housing interior 24b. The first and second oil housings 46a, 46b may be referred to as shrouds.

Having the first and second oil housings 46a, 46b defining oil housing interiors 47a, 47b that are configured to retain a portion of the lubricant provides several advantages. The first and second oil housing interiors 47a, 47b retain lubricant to supply a continuous amount of lubricant to the first and second pumps 48a, 48b, respectively, of the drive module assembly 20. The first and second pumps 48a, 48b are configured to distribute lubricant throughout the first and second housing interiors 24a, 24b, respectively, to various components, such as the first and second gear trains 40a, 40b, bearings, and the like. Specifically, during operation of the drive module assembly 20, the drive module assembly 20 may encounter various forces that cause the lubricant to move quickly to one side of the first housing interior 24a and the second housing interior 24b, such as during intense maneuvers (e.g. 1.1G turns), intense braking and acceleration, and the like, of a vehicle including the drive module assembly 20. However, with the first oil housing 46a defining the oil housing interior 47a and the second oil housing 46b defining the second oil housing interior 47b, a portion of lubricant is retained in the first oil housing interior 47a and second oil housing interior 47b, which allows the first pump 48a and the second pump 48b to have a continuous amount of lubricant. This, in turn, allows the first pump 48a to continuously disperse the lubricant throughout the first housing interior 24a to components that require lubrication and cooling, and the second pump 48b to continuously disperse the lubricant throughout the second housing interior 24b. The first and second oil housings 46a, 46b, in combination with the first and second housing interiors 24a, 24b being fluidly separate from one another, further ensures that the first and second pumps 48a, 48b have a continuous flow of lubricant.

In one embodiment, the first oil housing interior 47a and the second oil housing interior is configured to retain at least 20% of the total lubricant in the first housing interior 24a and the second housing interior 24b, respectively. In another embodiment, the first oil housing interior 47a and the second oil housing interior is configured to retain at least 25% of the total lubricant in the first housing interior 24a and the second housing interior 24b, respectively. In another embodiment, the first oil housing interior 47a and the second oil housing interior is configured to retain at least 30% of the total lubricant in the first housing interior 24a and the second housing interior 24b, respectively. In another embodiment, the first oil housing interior 47a and the second oil housing interior is configured to retain at least 35% of the total lubricant in the first housing interior 24a and the second housing interior 24b, respectively. In another embodiment, the first oil housing interior 47a and the second oil housing interior is configured to retain at least 40% of the total lubricant in the first housing interior 24a and the second housing interior 24b, respectively. In another embodiment, the first oil housing interior 47a and the second oil housing interior is configured to retain at least 45% of the total lubricant in the first housing interior 24a and the second housing interior 24b, respectively. In another embodiment, the first oil housing interior 47a and the second oil housing interior is configured to retain at least 50% of the total lubricant in the first housing interior 24a and the second housing interior 24b, respectively. In another embodiment, the first oil housing interior 47a and the second oil housing interior is configured to retain at least 55% of the total lubricant in the first housing interior 24a and the second housing interior 24b, respectively. In another embodiment, the first oil housing interior 47a and the second oil housing interior is configured to retain at least 60% of the total lubricant in the first housing interior 24a and the second housing interior 24b, respectively. In another embodiment, the first oil housing interior 47a and the second oil housing interior is configured to retain at least 70% of the total lubricant in the first housing interior 24a and the second housing interior 24b, respectively. In another embodiment, the first oil housing interior 47a and the second oil housing interior is configured to retain at least 75% of the total lubricant in the first housing interior 24a and the second housing interior 24b, respectively. In another embodiment, the first oil housing interior 47a and the second oil housing interior is configured to retain at least 80% of the total lubricant in the first housing interior 24a and the second housing interior 24b, respectively.

Although the description with reference to FIG. 7 refers to the first oil housing 46a, it is to be appreciated that corresponding description equally applies to the second oil housing 46b. The housing 22, or the first housing 22a when the housing 22 is further defined as the first and second housings 22a, 22b, typically has a bottom surface 50. The first oil housing 46a is typically engaged with the bottom surface 50 and the bottom surface 50 and the first oil housing 46a define the first oil housing interior 47. In one embodiment, the first oil housing 46a is removably coupled to the housing 22. In other words, the first oil housing 46a and the housing 22 are separate components (i.e., two pieces). In such embodiments, the first oil housing 46a may be coupled to the housing 22 in any suitable manner, such as through engagement with pins of the housing 22, through fasteners, and the like. When the first oil housing 46a is coupled to the housing 22 through pins of the housing 22, the pins apply a downward force to the first oil housing 46a such that the first oil housing 46a is engaged with the bottom surface 50 of the housing 22.

Again, the following description with respect to the first oil housing 46a equally applies to the second oil housing 46b. Having the first oil housing 46a engaged with the bottom surface 20 of the housing 22 offers several advantages. First, the engagement of the first oil housing 46a to the housing 22 reduces or minimizes the potential of lubricant to flow between the first oil housing 46*a* and the bottom surface 50 of the housing 22 such that lubricant is able to flow from the first oil housing interior 47*a*, between the first oil housing 46*a* and the bottom surface 50 of the housing 22, and into the first housing interior 24*a*. It is to be appreciated that the engagement between the first oil housing 46*a* and the bottom surface 50 of the housing 22 may be adjusted. For example, a tighter engagement between the first oil housing 46*a* and the bottom surface 50 of the housing 22 reduces the ability for lubricant to flow from the first oil housing interior 47*a* into the first housing interior 24*a*. However, depending on the application of the drive module assembly 20, it may be desirable to allow a predetermined amount of lubricant to flow between the first oil housing 46*a* and the bottom surface 50 of the housing 22. For example, during a full or partial failure of the first pump 48*a*, the lubricant would not be completely trapped in the first oil housing interior 47*a*, which allows some lubricant to exit the first oil housing interior 47*a* to be splashed and thrown by the first gear train 40*a* to provide limited lubrication and cooling to various components of the drive module assembly 20. Additionally, such a configuration of the first oil housing 46*a* allows more efficient manufacturing and allows flexibility on where to place the first oil housing 46*a* in the first housing interior 24*a*.

It is to be appreciated that in some embodiments the first oil housing 46*a* may be integral with the housing 22 (i.e., one piece). In such embodiments, lubricant in the first oil housing interior 47*a* is unable to exit the first oil housing interior 47*a* between the first oil housing 46*a* and the bottom surface 50 of the housing 22. In one embodiment, the filter 52 and the first oil housing 46*a* may be a single component. Similarly, the second oil housing 46*b* may be integral with the housing 22.

The drive module assembly 20 may also include one or more filters. The filters may be disposed in the first oil housing interior 47*a* and the second oil housing interior 47*b*.

With particular reference to FIG. 5, a representative oil housing is shown. It is to be appreciated that the oil housing in FIG. 5 may be representative of the first oil housing 46*a* and the second oil housing 46*b*. To this end, the oil housing in FIG. 5 is labeled with corresponding reference numbers for both the first oil housing 46*a* and the second oil housing 46*b*. The first oil housing 46*a* may have a first vertical wall 54*a* extending perpendicular with respect to the first input axis A1 partially defining the first oil housing interior 47*a*, and a first upper wall 56*a* extending perpendicular to the first vertical wall 54*a* and further defining the first oil housing interior 47*a*. The second oil housing 46*b* may have a second vertical wall 54*b* extending perpendicular with respect to the second input axis A2 partially defining the second oil housing interior 47*b*, and a second upper wall 56*b* extending perpendicular to the second vertical wall 54*b* and further defining the second oil housing interior 47*b*. The first and second upper walls 56*a*, 56*b* help further retain the lubricant in the first and second oil housing interiors 47*a*, 47*b*, respectively, during quick movements of the drive module assembly 20. To replenish the lubricant in the first and second oil housing interiors 47*a*, 47*b*, the first upper wall 56*a* may define a first collection hole 58*a* for collecting lubricant to retain lubricant in the first oil housing interior 47*a*, and the second upper wall 56*b* may define a second collection hole 58*b* for collecting lubricant to retain lubricant in the second oil housing interior 47*b*. Typically, the first and second collection holes 58*a*, 58*b* are adjacent the first and second gear trains 40*a*, 40*b*, respectively, to collect lubricant that drips off of the first and second gear trains 40*a*, 40*b*. However, it is to be appreciated that the first and second collection holes 58*a*, 58*b* may be located in any suitable location to collect the lubricant. The first and second upper walls 56*a*, 56*b* may be angled with respect to the first and second input axes A1, A2 such that when lubricant is disposed on the first and second upper walls 56*a*, 56*b* the lubricant is encouraged to migrate toward and through the first and second collection holes 58*a*, 58*b*. The drive module assembly 20 may include a first collection plate 59*a* coupled to the housing 22 and disposed adjacent the first oil housing 46*a*, and the drive module assembly 20 may include a second collection plate 59*b* coupled to the housing and disposed adjacent the second oil housing 46*b*. When present, the collection plates 59*a*, 59*b* help direct lubricant into and through the first and second collection holes 58*a*, 58*b*. The collection holes 58*a*, 58*b* are sized such that, during an intense maneuver, the lubricant in the oil housing interiors 47*a*, 47*b* is held in the oil housing interiors 47*a*, 47*b* by the upper walls 56*a*, 56*b*, respectively.

The drive module assembly 20 may include a first retaining projection 60*a* disposed in the first housing interior 24*a* and adjacent the first oil housing 46*a*. The drive module assembly 20 may also include a second retaining projection 60*b* disposed in the second housing interior 24*b* and adjacent the second oil housing 46*b*. When present, the first and second retaining projections 60*a*, 60*b* are configured to retain lubricant adjacent the first and second oil housings 46*a*, 46*b*, respectively. Specifically, as shown in FIG. 3 for the second retaining projection 60*b* and in FIG. 7 for the first retaining projection 60*a*, if any lubricant exits the first oil housing interior 47*a* between the first oil housing 46*a* and the bottom surface 50 of the housing 22, the first retaining projection 60*a* prevents any further egress of the lubricant into the first housing interior 24*a*. Similarly, if any lubricant exits the second oil housing interior 47*b* between the second oil housing 46*b* and the bottom surface 50 of the housing, the second retaining projection 60*b* prevents any further egress of the lubricant into the second housing interior 24*b*. The lubricant retained by the first and second retaining projections 60*a*, 60*b* then is able, depending on how tightly the first and second oil housings 46*a*, 46*b* and bottom surface 50 of the housing 22 are engaged, to flow between the first oil housing 46*a* and the bottom surface 50 of the housing 22 and into the first oil housing interior 47*a* and to flow between the second oil housing 46*b* and the bottom surface 50 of the housing 22 and into the second oil housing interior 47*b*. The first and second retaining projections 60*a*, 60*b* may be integral with the housing 22 (i.e., one piece) or the first and second retaining projections 60*a*, 60*b* may be a separate component from the housing 22 (i.e., two pieces). The first and second retaining projections 60*a*, 60*b* may have a first and second protruding portion 62*a*, 62*b*. When present, the first and second protruding portions 62*a*, 62*b* extend toward the first and second oil housings 46*a*, 46*b*, respectively, to further retain lubricant between the first and second retaining projections 60*a*, 60*b* and the first and second oil housings 46*a*, 46*b*, respectively. The first and second protruding portions 62*a*, 62*b* may cooperate in shape with the first and second oil housings 46*a*, 46*b*. For example, as shown in FIGS. 3 and 7, the first and second protruding portions 62*a*, 62*b* have a circular configuration that cooperates with a curved portion 64*a*, 64*b* of the first and second oil housings 46*a*, 46*b*.

What is claimed is:

1. A drive module assembly comprising:

a housing defining a housing interior for containing a lubricant, wherein said housing interior is further defined as a first housing interior and a second housing interior;

a first input shaft disposed in said first housing interior, extending along a first input axis, coupled to said housing, and configured to receive rotational torque from a first power source;

a first gear train disposed in said first housing interior and rotatably coupled to said first input shaft;

a first output shaft rotatably coupled to said first gear train and configured to provide rotational torque;

a second input shaft disposed in said second housing interior, extending along a second input axis, coupled to said housing, and configured to receive rotational torque from a second power source;

a second gear train disposed in said second housing interior and rotatably coupled to said second input shaft;

a second output shaft rotatably coupled to said second gear train and configured to provide rotational torque; and a first oil housing disposed in said first housing interior and a second oil housing disposed in said second housing interior, wherein said first oil housing defines a first oil housing interior that is configured to retain a portion of the lubricant in the first housing interior, and wherein said second oil housing defines a second oil housing interior that is configured to retain a portion of the lubricant in the second housing interior;

wherein said first housing interior and said second housing interior are fluidly separate from one another such that lubricant in said first housing interior is prevented from moving into said second housing interior and such that lubricant in said second housing interior is prevented from moving into said first housing interior;

wherein said first oil housing has a first vertical wall extending perpendicular with respect to said first input axis and partially defining said first oil housing interior, and a first upper wall extending perpendicular with respect to said first vertical wall such that said first upper wall is configured to retain a portion of the lubricant in said first housing interior by further defining said first oil housing interior, and wherein said second oil housing has a second vertical wall extending perpendicular with respect to said second input axis and partially defining said second oil housing interior, and a second upper wall extending perpendicular with respect to said second vertical wall such that said second upper wall is configured to retain a portion of the lubricant in the second housing interior by further defining said second oil housing interior;

wherein said first upper wall defines a first collection hole for collecting lubricant to retain lubricant in said first oil housing interior and said second upper wall defines a second collection hole for collecting lubricant to retain lubricant in said second oil housing interior; and wherein said first upper wall is angled with respect to said first and second input axes such that when lubricant is disposed on said first upper wall the lubricant is encouraged to migrate toward and through said first collection hole, and wherein said second upper wall is angled with respect to said first and second input axes such that when lubricant is disposed on said second upper wall the lubricant is encouraged to migrate toward and through said second collection hole.

2. The drive module assembly as set forth in claim 1, wherein said housing is further defined as a first housing defining said first housing interior and a second housing defining said second housing interior.

3. The drive module assembly as set forth in claim 1 further comprising a dividing wall disposed between said first housing interior and said second housing interior, wherein said dividing wall fluidly separates said first housing interior from said second housing interior.

4. The drive module assembly as set forth in claim 3, wherein said housing is further defined as a first housing defining said first housing interior and a second housing defining a second housing interior, and wherein said dividing wall is removably coupled to one of said first and second housings.

5. The drive module assembly as set forth in claim 1 further comprising a first pump coupled to said housing and configured to distribute lubricant throughout the first housing interior, and a second pump coupled to said housing and configured to distribute lubricant throughout the second housing interior.

6. The drive module assembly as set forth in claim 5 further comprising a first and second scavenge pump coupled to said housing and configured to pump lubricant into a first sump in said first housing interior, and a third and fourth scavenge pump coupled to said housing and configured to pump lubricant into a second sump in said second housing interior.

7. The drive module assembly as set forth in claim 1, wherein forced lubrication is used to lubricate the first and second housing interiors.

8. A drive module system comprising said drive module assembly as set forth in claim 1, said drive module system further comprising:

said first power source; and said second power source.

9. The drive module system as set forth in claim 8, wherein said housing is further defined as a first housing defining said first housing interior and a second housing defining said second housing interior.

10. The drive module system as set forth in claim 8 further comprising a dividing wall disposed between said first housing and said second housing, wherein said dividing wall fluidly separates said first housing interior from said second housing interior.

11. The drive module system as set forth in claim 10, wherein said housing is further defined as a first housing defining said first housing interior and a second housing defining a second housing interior, and wherein said dividing wall is removably coupled to one of said first and second housings.

12. The drive module system as set forth in claim 8, wherein said first power source is further defined as first electric machine and said second power source is further defined as a second electric machine.

13. The drive module system as set forth in claim 12, wherein said first electric machine is disposed in said first housing interior and said second electric machine is disposed in said second housing interior.

14. The drive module system as set forth in claim 8 further comprising a first pump coupled to said housing and configured to distribute lubricant throughout the first housing interior, and a second pump coupled to said housing and configured to distribute lubricant throughout the second housing interior.

15. The drive module system as set forth in claim 14 further comprising a first and second scavenge pump coupled to said housing and configured to pump lubricant into a first sump in said first housing interior, and a third and fourth scavenge pump coupled to said housing and configured to pump lubricant into a second sump in said second housing interior.

16. A vehicle including said drive module system as set forth in claim 8, and further comprising wheels configured to receive rotational torque from said drive module system.

17. The drive module assembly as set forth in claim 1, wherein said housing has a bottom surface, wherein said first upper wall is disposed between said bottom surface and said first input axis, and wherein said second upper wall is disposed between said bottom surface and said second input axis.

18. The drive module assembly as set forth in claim 1 further comprising a first collection plate coupled to said housing and disposed adjacent said first oil housing, and a second collection plate coupled to said housing and disposed said second oil housing, wherein said first collection plate directs lubricant through a first collection hole into said first oil housing interior and said second collection plate directs lubricant through a second collection hole into said second oil housing interior.

* * * * *